H. L. BLOOD.
PLANER AND SYSTEM OF MOTOR CONTROL THEREFOR.
APPLICATION FILED AUG. 1, 1921.

1,432,831.

Patented Oct. 24, 1922.

Inventor
Harold L. Blood
By Wayne B Wells
Attorney

Patented Oct. 24, 1922.

1,432,831

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER AND SYSTEM OF MOTOR CONTROL THEREFOR.

Application filed August 1, 1921. Serial No. 488,787.

(GRANTED UNDER THE PROVISIONS OF THE ACT OF MARCH 3, 1921, 41 STAT. L., 1313.)

*To all whom it may concern:*

Be it known that I, HAROLD L. BLOOD, a citizen of the United States, residing at Plainfield, in the county of Union and State of New Jersey, have invented certain new and useful Improvements in Planers and Systems of Motor Control Therefor (for which I have filed application in Canada July 14, 1919, Patent No. 206,321), of which the following is a specification.

It will be understood that when I refer to a planer I intend to include any mechanism, particularly a machine tool, which comprises an element (such as a work-carrying table) adapted to travel forward and backward, and an element (such as a cutting tool) cooperating with the table; and it will be further understood that, with certain obvious modifications, the invention can be applied to a metal working or other machine in which the tool instead of the table is reciprocated.

The invention relates particularly to a planer in which the reciprocating table is positively connected with an electric motor which is periodically reversed to effect the table reciprocations.

One object of the invention is to provide for a planer of the class described, an improved electrical controlling system. Stated more specifically, one of the objects of the invention is to provide improved means for cutting out the starting resistance of the motor and gradually bringing the motor up to speed; another object is to provide improved means whereby the closing of the dynamic-braking circuit is retarded to insure the prior connection of the starting resistance into the circuit; and a further object is to provide improved means whereby the main starting switches are prevented from closing except under the proper circumstances. Additional objects of the invention will be apparent from the following specification and claims.

This application is a continuation in part of my application Serial No. 228, 598, filed April 15th, 1918.

In the accompanying drawing I have illustrated the invention as applied to a planer but it will be understood that the drawing is for illustrative purposes only and is not to be construed as defining or limiting the scope of the invention, the accompanying claims being relied upon for that purpose.

Figure 1:
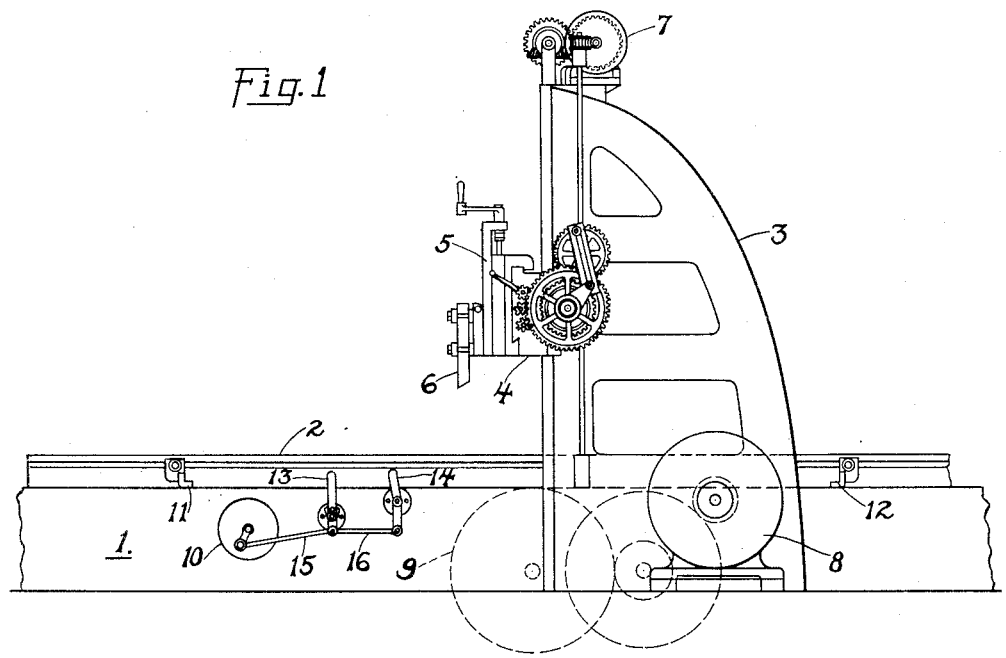
Figure 1 is a fragmentary side view of a planer embodying the invention.

Referring to the drawing, the bed 1 of a planer supports a work-carrying table 2 which is reciprocable longitudinally of the bed. At the sides of the bed and of the table are located uprights 3 of which one is shown in the drawing. A crossrail 4 is carried by the uprights 3 and is vertically adjustable thereon. Transversely adjustable along the crossrail are one or more crossheads 5 adapted to carry tools 6. For moving the crossrail vertically and for adjusting the crossheads there is provided a suitable mechanism which, as shown, includes a separate electric motor 7. The mechanical and electrical connections for the motor 7 constitute no part of the present invention and detailed description is deemed unnecessary. As illustrated, these parts are similar to those shown in the Greenleaf & Keefer Patent No. 1,299,192 dated April 1st, 1919, to which reference can be had for detailed information.

An electric motor 8, which is directly connected to the table by means of suitable spur gearing such as indicated at 9, is provided for driving the reciprocating table 2. A pilot switch 10 is secured to the planer bed for controlling the motor 8. The switch 10 is operated by adjustable dogs 11 and 12 engaging levers 13 and 14. As shown, the levers 13 and 14 are connected to the pilot switch by means of links 15 and 16. It will be seen that at the end of the movement of the bed toward the right, that is, at the end of the cutting stroke, the dog 11 will engage the lever 13 and move the switch 10 in one direction; and at the end of the movement of the table toward the left, that is, in the return direction, the dog 12 will engage the lever 14 and move the switch 10 in the opposite direction.

Figure 2:
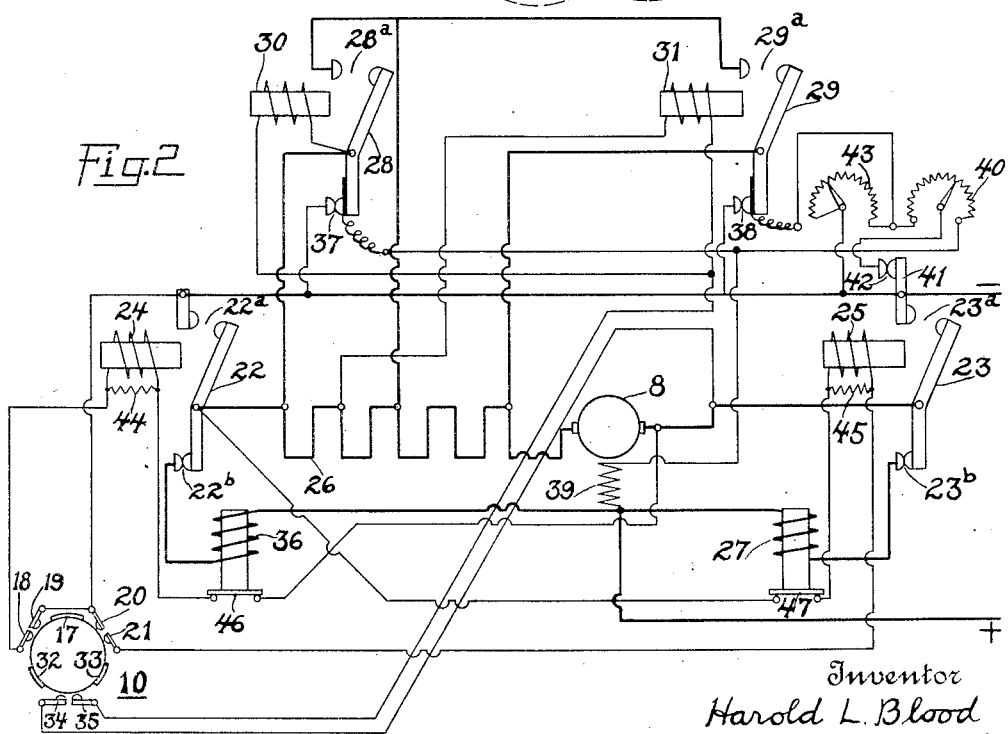
Fig. 2 is a diagram of electrical connections.

The electrical diagram in Fig. 2 presents a system which for the sake of convenience is illustrated in simplified form. It will be understood that in practice various changes and additions may be made, such as are necessary for a practical system.

Referring to the wiring diagram in Fig. 2, it will be seen that the pilot switch 10 is provided with a contact segment 17 adapted effectively to bridge either the two contact members 18 and 19 or the two contact members 20 and 21.

Two main controlling switches 22 and 23 are operated respectively by electro-magnets 24 and 25. The electro-magnets 24 and 25 are controlled by the pilot switch 10. The switches 22 and 23 are provided respectively with upper pairs of contact members 22$^a$ and 23$^a$ and with lower pairs of contact members 22$^b$ and 23$^b$ so arranged that the contact members of one pair are separated whenever the contact members of the other pair are engaged. When the magnets are de-energized, the upper pairs of contact members are separated, as shown in the drawing.

When the pilot switch 10 is moved at the end of the return stroke into position for the cutting stroke, the contact segment 17 bridges the contact members 18 and 19, thus partly establishing a circuit from the negative side of the supply circuit through the switch contact members 18, 17 and 19 to the coil of the magnet 24, the circuit through the magnet being completed by other devices to be presently described. The energizing of the magnet 24 causes the engagement of the contact members 22$^a$, thus establishing a connection from the negative side of the supply circuit to one terminal of the armature of the motor 8 through a starting resistance 26. The other terminal of the motor armature is connected to the positive side of the supply circuit through the contact members 23$^b$, and through the coil of a solenoid 27, which may be arranged to serve as a blow-out magnet. The circuit through the motor armature having been thus completed, the motor starts in the proper direction to drive the table 2 in the direction for a cutting operation.

Two accelerating switches 28 and 29 are provided for automatically short-circuiting the starting resistance 26. The switches 28 and 29 are operated respectively by electro-magnets 30 and 31. The switches are provided respectively with upper pairs of contact members 28$^a$ and 29$^a$. When the magnets are de-energized, the contact members are separated, as shown in the drawing. The contact members 28$^a$ are so connected that when engaged they will short-circuit the left-hand part of the starting resistance 26. The contact members 29$^a$ are so connected that when engaged they will short-circuit the right-hand part of the starting resistance 26.

The coil of the magnet 30 is connected in parallel to the resistance 26 and the motor armature. The result is that initially the entire main line voltage is impressed upon the magnet. The magnet, therefore, acts to close the switch 28 almost immediately after the completion of the main motor circuit, thus short-circuiting the left-hand part of the resistance. The coil of the magnet 31 is connected similarly to the coil of the magnet 30 except that its circuit includes a part of the resistance 26. The result is that a lesser voltage is impressed upon the magnet 31 and therefore the switch 29 does not immediately move, or at least moves but slowly, toward its closed position. As soon, however, as the switch 28 has closed and has short-circuited the left-hand section of the starting resistance, the coil of the magnet 31 is subjected to the full main line voltage. The switch 29 thereupon immediately closes, thus short-circuiting the remaining part of the resistance 26.

To prevent the coil 30 being energized by current flowing through the armature 8 and the resistance 26 at the time a braking circuit is closed, I provide means such as movable contact segments 32 and 33 on the pilot switch 10. Adjacent the movable contact segments 32 and 33 are stationary contact members 34 and 35. The contact members 34 and 35 are in the circuit including the coils 30 and 31. When the pilot switch 10 is oscillated to operative position for starting the motor armature 8 in either direction, the circuit for the coils 30 and 31 is closed by either contact segment 32 or 33, connecting contact members 34 and 35. As soon as the pilot switch is returned to its neutral or central position, the circuit for the coils 30 and 31 is opened by the movement of the contact segments 32 and 33 to the position shown in the drawing, thus again separating the contact members 34 and 35. The contact segments 32 and 33 are so located on the pilot switch as to open the energizing circuits for the coils 30 and 31 prior to the opening of the energizing circuit of the operated main switch. The coils 30 and 31, therefore, cannot be energized by the counter electromotive force of the motor 8 after the contact members 18 and 19 or 20 and 21 have been opened by oscillation of the pilot switch 10 to its central or neutral position.

The connections shown and described for the magnets 30 and 31 are simple and are such that the switches 28 and 29 are closed automatically and in succession. It is impossible for the switch 29 to close simultaneously with the switch 28 as it cannot receive the full voltage until the switch 28 has closed.

Near the end of the cutting stroke the pilot switch 10 moves the contact segment 17 away from the contact members 18 and 19. The circuit through the magnet 24 is opened and the upper contact members 22ª of the switch 22 are permitted to separate, the lower contact members 22ᵇ engaging as shown in the drawing. The switches 28 and 29 immediately open, thus removing the short circuits across the resistance 26. The engaging of the lower contact members 22ᵇ of the switch 22 completes a dynamic-braking circuit which extends through the motor 8, the resistance 26, the contact members 22ᵇ, the solenoid 36 (similar to the solenoid 27), the solenoid 27, and the contact members 23ᵇ to the armature of the motor. The dynamic-braking current flowing through such circuit quickly brings the motor and the table to rest.

The movement of the pilot switch 10 at the end of the cutting stroke into position for the return stroke, causes the contact segment 17 to bridge the contact members 20 and 21. Such connection partly establishes a circuit from the negative side of the supply circuit through the switch contact members 20, 17 and 21 to the coil of the magnet 25, the circuit through the magnet being completed by other devices to be presently described. The magnet 25 causes the contact members 23ª to engage, thus connecting the negative side of the supply circuit to one terminal of the armature of the motor 8. The other terminal of the armature is connected to the positive side of the supply circuit through the resistance 26, the contact members 22ᵇ and the solenoid 36. The armature connections being reversed, the motor rotates in the opposite direction. The accelerating switches 28 and 29 are operated in the manner already described, thus short-circuiting the resistance 26.

Near the end of the return movement the contact members 23ª are separated and the contact members 23ᵇ engaged, dynamic braking then taking place, as before described.

Preferably during starting I vary the field strength of the motor 8 as well as the armature resistance. For this purpose I provide supplemental pairs of contact members 37 and 38 positioned respectively near the lower ends of the switches 28 and 29 and insulated therefrom. When the two switches are open, as shown, both pairs of contact members 37 and 38 are engaged and a circuit for the motor field-magnet winding 39 is established from the positive side of the supply circuit, through the field-magnet winding and the contact members 37 to the negative side of the supply circuit. Thus, at starting, the field-magnet winding receives the full main line voltage. Assuming the contact members 22ª to be engaged and the motor to be starting to rotate in the cutting direction, it will be seen that as soon as the switch 28 is closed the contact members 37 will be separated. The separating of the contact members 37 inserts a resistor 40 into circuit with the field-magnet winding 39. When the switch 29 is closed the contact members 38 will be separated, but this will have no effect on the field excitation during the cutting stroke. It will be seen that more or less of the resistor 40 can be inserted into the circuit to vary the speed of the motor during the cutting operation.

Preferably, as shown, one of the contact members 23ª is movable, and as shown it is carried by a pivoted lever 41. Contact members 42 are located near the upper end of the lever 41. The contact members 42 are in the circuit between the resistor 40 and the negative side of the supply circuit. When the contact members 23ª are engaged, the contact members 42 are separated, thus breaking the direct connection between the resistor 40 and the negative side of the supply circuit. Assuming the contact members 23ª to be engaged, and the motor to be starting in the return direction, it will be seen that the closing of the switch 28 separates the contact members 37, thus inserting the resistor 40 into circuit with the field-magnet winding 39 (the contact members 42 being now separated). The circuit extends from the resistor 40 through the contact members 38. When the switch 29 is closed the contact members 38 are separated, thus inserting into circuit with the field-magnet winding a part of a resistor 43 which is similar to the resistor 40. It will be seen that the resistor 43 is adjustable to vary the speed of the motor during the return stroke. Inasmuch as both of the resistors 40 and 43 are in circuit with the field-magnet winding during the return stroke, the speed of the motor during that stroke will be much greater than during the cutting stroke.

Preferably high resistances 44 and 45 are connected respectively across the coils of the magnets 24 and 25. Such resistances serve to provide a closed circuit for the coils when the normal energizing circuits are broken, thus causing the coils to become de-energized relatively slowly. The result is that the switches 22 and 23 are caused to move slowly to separate the contact members 22ª or 23ª and to engage the contact members 22ᵇ or 23ᵇ at the end of movement of the motor in one direction or the other. As soon as the upper contact members of one or the other of the switches are separated, the switches 28 and 29 will instantly open, thus removing the short circuits from the resistance 26. The resistances 41 and 45 across the coils 24 and 25 cause the switches 22 and 23 to move slowly enough so that the switches 28 and 29 will have time to open before the lower contact members of the switches 22 and 23 are engaged. When the pilot switch 10 operates very quickly and effects the de-energization of all switches nearly simultaneously, the resistors 44 and 45 insure the opening of the switches 28 and 29 prior to the opening of either of the switches 22 and 23. Obviously, it is important that the short circuits around the starting resistance be removed before the dynamic-braking circuit is established, as otherwise a dangerously large braking current might be generated.

It will be noted that switches 46 and 47 are provided respectively at the lower ends of the solenoids 36 and 27. Each of these switches is automatically kept open so long as any considerable current flows through the coil of the corresponding solenoid. It will be seen that the circuit for the magnet 24 extends through the switch 46 and thence through the contacts 23$^b$ to the positive supply conductor. Similarly, the circuit for the magnet 25 extends through the switch 47 and thence through the contacts 22$^b$ to the positive supply conductor. In view of the fact that the circuit for the magnet 24 extends through the contacts 23$^b$ and that the circuit for the magnet 25 extends through the contacts 22$^b$, neither of the magnets 24 or 25 can be energized so long as any considerable braking current is flowing. It will further be clear that neither of the magnets can be energized so long as the opposite switch 22 or 23 is positioned with its lower contacts separated. During normal operation the switch 10 will be moved almost instantly from one position to the other, but notwithstanding the connection of the two contact members 18 and 19 or the two contact members 20 and 21, neither of the pairs of upper contact members 22$^a$ or 23$^a$ can be engaged while the other pair is engaged and neither of them can be engaged while a dynamic-braking current is still flowing.

What I claim is:

1. In a control system, the combination comprising a motor, two main electro-magnetic switches having circuit connections thereto for operating the motor in a forward and in a reverse direction and for completing a dynamic-braking circuit through the motor, means for so connecting the switch energizing circuits as to prevent the simultaneous operation of the switches, and two interlock magnets having two switch members, each of said switch members being connected in only one of the energizing circuits of said two main switches for preventing the movement of either main switch to an operative position when a dynamic-braking current is flowing.

2. In a control system, the combination comprising a motor, two main electro-magnetic switches having circuit connections thereto for operating the motor in a forward and in a reverse direction and for completing a dynamic-braking circuit, means for so connecting the switch energizing circuits through the switch contact members as to prevent the simultaneous operation of the two switches, and two electromagnets having two switch members, each of said switch members being connected in only one of the energizing circuits of said two main switches for preventing the operation of either of said main switches when a dynamic-braking current is flowing.

3. In a control system, the combination comprising a motor, two main switches for operating the motor in a forward and in a reverse direction, two auxiliary switches controlled by said main switches, resistance included in the circuit of the motor armature, and resistance included in the circuit of the motor field-magnet winding, each of said auxiliary switches serving to vary the resistance in the armature circuit and the resistance in the field-magnet winding circuit.

4. In a control system, the combination comprising a motor, two main switches having circuit connections thereto for operating the motor in a forward and in a reverse direction and for completing a dynamic-braking circuit, a starting resistance in circuit with the motor armature, a second resistance in circuit with the motor field-magnet winding, and two auxiliary switches controlled by the two main switches and serving to vary the resistance in the armature circuit and the resistance in the field-magnet winding circuit.

5. In a control system, the combination comprising a motor, a reciprocating member, a pilot switch operated by said reciprocating member, two main electro-magnetic switches controlled by said pilot switch for operating the motor in a forward and in a reverse direction, and two auxiliary electro-magnetic switches controlled by the main switches for governing the acceleration of the motor, said pilot switch having contact members for opening the energizing circuits of the auxiliary switches prior to the opening of the energizing circuit of either of the main switches.

6. In a control system, the combination with a motor, a pilot switch, and main electro-magnetic switches controlled by said pilot switch for operating the motor, of auxiliary electro-magnetic switches controlled by the main switches for governing the acceleration of the motor, said pilot switch serving to open the energizing circuits of the auxiliary switches prior to the opening of the energizing circuits of either of the main switches, and means in the energizing circuits of the main switches to insure the opening of the auxiliary switch prior to the opening of the main switches.

7. In a control system, the combination with a motor, a reciprocating member, a pilot switch operated by said reciprocating member, and two main electro-magnetic switches controlled by said pilot switch for operating the motor in a forward and in a reverse direction, of two auxiliary electro-magnetic switches controlled by the main switches for governing the acceleration of the motor, said pilot switch having contact members for opening the energizing circuits of the auxiliary switches prior to the opening of the energizing circuit of either of the main switches, and relatively high resistance members connected across the energizing coils of the main switches to insure the opening of the auxiliary switches prior to the opening of the main switches.

8. The combination with a reciprocating table, a supply circuit, a reversing electric table-driving motor, a table-operated pilot switch, and two main electro-magnetic switches operated by the pilot switch at the ends of the table movements to start the motor alternately in opposite directions, said two switches also serving to complete a dynamic-braking circuit through the motor when simultaneously released, of a starting resistance in circuit with the motor armature, and two auxiliary electro-magnetic switches controlled by the two main switches for short-circuiting successive parts of the starting resistance, one of said auxiliary switches having its energizing circuit connected across the supply circuit at all times when said motor is in operation so that the switch will be closed almost immediately after the closing of the motor circuit and the other auxiliary switch having included in its circuit a part of the resistance short-circuited by the first switch whereby the second switch will be closed only after the first switch has closed.

9. A reciprocating table, a reversing electric table-driving motor, a table-operated pilot switch, and main electro-magnetic switches operated by the pilot switch at the ends of the table movements to start the motor alternately in opposite directions, in combination with a starting resistance in circuit with the motor armature, a second resistance in circuit with the motor field-magnet winding, two auxiliary electro-magnetic switches for short-circuiting successive parts of the starting resistance, one switch having its energizing circuit connected across the main line at all times when said motor is operating so that the switch will be closed almost immediately after the closing of the motor circuit and the other switch having included in its circuit a part of the resistance short-circuited by the first switch whereby the second switch will be closed only after the first switch has closed, and means associated with the said auxiliary switches for successively placing parts of the second resistance in circuit with the motor field-magnet winding.

10. A reciprocating table, a reversing electric table-driving motor, a table-operated pilot switch, and two main electro-magnetic switches controlled by the pilot switch and serving respectively at the ends of the table movements to close a dynamic-braking circuit and to start the motor alternately in opposite directions, in combination with a starting resistance in circuit with the motor armature, a second resistor in circuit with the motor field-magnet winding, an automatically acting auxiliary electro-magnetic switch mechanism for short-circuiting part of the starting resistance, means comprising high resistances in parallel with the operating magnets of the main switches for insuring the closing of the braking circuit is delayed until the auxiliary switch mechanism has restored the resistance to the said circuit, and a supplemental switch operated by one of the main switches for limiting the amount of the second resistance placed in circuit with the field-magnet winding.

11. A reciprocating table, a reversing electric table-driving motor, a table-operated pilot switch, and two main electro-magnetic switches controlled by the pilot switch and serving respectively at the ends of the table movements to close a dynamic-braking circuit and to start the motor alternately in opposite directions, in combination with a starting resistance in circuit with the motor armature, an automatically acting auxiliary electro-magnetic switch mechanism for short-circuiting part of the starting resistance, and means comprising high resistances in parallel with the operating magnets of the main switches for insuring the closing of the braking circuit is delayed until the auxiliary switch mechanism has restored the resistance to the said circuit.

12. A reciprocating table, a reversing electric table-driving motor, a table-operated pilot switch, and two main electro-magnetic switches controlled by the pilot switch and serving respectively at the ends of the table movements to close a dynamic-braking circuit and to start the motor alternately in opposite directions, in combination with a starting resistance in circuit with the motor armature, two automatically acting auxiliary electro-magnetic switches for short-circuiting successive parts of the starting resistance, and means comprising high resistances in parallel with the operating magnets of the main switches for insuring the closing of the braking circuit is delayed until the auxiliary switches have opened to restore the resistance to the said circuit.

13. A reciprocating table, a reversing electric table-driving motor, a table-operated pilot switch, and two main electro-magnetic switches controlled by the pilot switch and serving respectively at the ends of the table movements to close a dynamic-braking circuit and to start the motor alternately in opposite directions, in combination with a starting resistance in circuit with the motor armature, two automatically acting auxiliary electro-magnetic switches for short-circuiting successive parts of the starting resistance, one switch having its energizing circuit adapted to be connected across the main line so that the switch will be closed almost immediately after the closing of the motor circuit and the other switch having included in its circuit a part of the resistance short-circuited by the first switch whereby the second switch will be closed only after the first switch has closed, and means comprising high resistances in parallel with the operating magnets of the main switches for insuring the closing of the braking circuit is delayed until the auxiliary switches have opened to restore the resistance to the said circuit.

14. A reciprocating table, a reversing electric table-driving motor, a table-operated pilot switch, and two main electro-magnetic switches controlled by the pilot switch and each having two sets of contact members, the contact members of one set serving when the magnets are deenergized at the ends of the table movements to close a dynamic-braking circuit and the contact members of the other set serving when the electro-magnets are energized to start the motor alternately in opposite directions, in combination with operating circuits for the switches each extending through contact members of the other switch and connected to prevent its own switch from being closed when the other switch is closed, and two interlock magnets having switch members in the operating circuits of the two main magnets, each of said switch members being connected in only one of the energizing circuits of said two main magnets for preventing the closing of the said circuits while current flows in the said dynamic-braking circuit.

15. A reciprocating table, a reversing electric table-driving motor, a table-operated pilot switch, and two main electro-magnetic switches controlled by the pilot switch and each having two sets of contact members, the contact members of one set serving when the magnets are de-energized at the ends of the table movements to close a dynamic-braking circuit and the contact members of the other set serving when the electro-magnets are energized to start the motor alternately in opposite directions, in combination with operating circuits for the switches, one of which circuits being connected to remain open until the dynamic-braking circuit of the motor is completed, and two electro-magnets having switch members in the operating circuits of the two main magnets, each of said switch members being connected in only one of the energizing circuits of said two main magnets for preventing the closing of the said circuits while current flows in the said dynamic-braking circuit.

In testimony whereof, I hereto affix my signature.

HAROLD L. BLOOD.